United States Patent [19]

Irizato et al.

[11] Patent Number: 5,736,609
[45] Date of Patent: Apr. 7, 1998

[54] SULFUR-CONTAINING URETHANE-BASED RESIN COMPOSITION, ITS RESIN, AND OPTICAL ELEMENT AND LENS COMPRISING RESIN

[75] Inventors: Yoshihiro Irizato, Kanagawa-ken; Shinichi Umeda, Fukuoka-ken; Yoshinobu Kanemura, Fukuoka-ken; Teruyuki Nagata, Fukuoka-ken, all of Japan

[73] Assignee: Mitsui Toatsu Chemicals, Inc., Tokyo, Japan

[21] Appl. No.: 663,734

[22] Filed: Jun. 14, 1996

[30] Foreign Application Priority Data

Jun. 30, 1995 [JP] Japan .................................. 7-165284

[51] Int. Cl.⁶ .................................................. C08G 18/62
[52] U.S. Cl. ........................... 525/131; 528/73; 359/642; 351/159; 522/135
[58] Field of Search ........................ 528/73; 359/642; 525/131; 351/159; 522/135

[56] References Cited

U.S. PATENT DOCUMENTS 5,578,658  11/1996  Sasagawa et al. ....................... 523/105

FOREIGN PATENT DOCUMENTS

| 0188880 | 7/1986 | European Pat. Off. . |
| 0490778 | 6/1992 | European Pat. Off. . |
| 0659790 | 6/1995 | European Pat. Off. . |

OTHER PUBLICATIONS

Database WPI, Week 9310, Derwent Publications Ltd., London, GB; AN 93–080455, XP002018962 & JP-A-05025240 (Mitsubishi Rayon Co. Ltd.), 2 Feb. 1993 *abstract*.

*Primary Examiner*—Rachel Gorr
*Attorney, Agent, or Firm*—Burns, Doane, Swecker & Mathis

[57] ABSTRACT

The present invention discloses a sulfur-containing urethane-based resin composition of the present invention is directed to a sulfur-containing urethane-based resin composition which comprises a polythiol compound represented by formula (1):

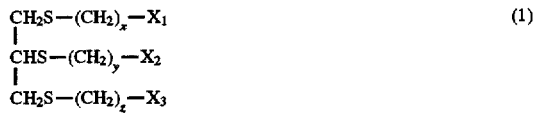

wherein $X_1$, $X_2$ and $X_3$ each is a hydrogen atom or a mercapto group; x, y and z each is an integer of 0 to 8; and in their combinations, formula (1) has at least two mercapto groups,
a polyiso(thio)cyanate compound, and a compound having two or more reactive unsaturated groups in an amount of 30 to 70% by weight based on the total weight of the composition, or a sulfur-containing urethane-based resin composition which comprises the polythiol compound represented by formula (1), the polyiso(thio)cyanate compound, the compound having two or more reactive unsaturated groups in an amount of 10 to 70% by weight based on the total weight, and a photopolymerization catalyst.

36 Claims, No Drawings

SULFUR-CONTAINING URETHANE-BASED RESIN COMPOSITION, ITS RESIN, AND OPTICAL ELEMENT AND LENS COMPRISING RESIN

BACKGROUND OF THE INVENTION (i) Field of the Invention

The present invention relates to a sulfur-containing urethane-based resin composition containing a reactive unsaturated compound, a resin obtained by the use of this composition, and an optical element and a lens comprising this resin.

(ii) Description of the Related Art

Plastic lenses are more lightweight, less breakable and more easily dyeable as compared with inorganic lenses, and for this reason, in recent years, they have rapidly spread in the fields of optical elements such as the lenses of spectacles and cameras.

At present, as resins which have been widely used for these purposes, there are products obtained by the radical polymerization of diethylene glycol bis(allyl carbonate) (hereinafter referred to as "DAC"). These resins are characterized by being lightweight and being excellent in impact resistance, dyeability and working properties such as cutting properties and polishing properties.

However, the refractive index of the DAC lens is $n_D=1.50$, which is lower as compared with the inorganic lens ($n_D=1.52$), and in order to obtain optical characteristics equal to those of the inorganic lens, it is necessary to increase the center thickness, the edge thickness and the curvature of the lens, and when such requirements are met, the lens is unavoidably thickened on the whole. Therefore, a plastic lens having physical properties equal to those of the DAC resin and a higher refractive index than that of the inorganic lens has been desired.

As a lens which can meet these requirements, a polyurethane plastic resin is known. As this kind of polyurethane plastic resin, the present inventors have suggested polyurethane lenses comprising a polymer of a xylylene diisocyanate compound and a polythiol compound in, for example, Japanese Patent Application Laid-open No. 46213/1988, and these lenses have widely been used as lenses for spectacles and optical lenses.

In the manufacture of this polyurethane lens, however, polymerization is usually required to be carried out for a long time of 8 hours or more in order to obtain the optical strain-free and striae-free lens which is satisfactory as the plastic lens. Thus, the shortening of this polymerization time has been desired. In addition, the surface of this lens is too soft and can be scratched, and therefore it is necessary to apply a protective coat onto the surface of this lens.

Furthermore, Japanese Patent application Laid-open No. 228659/1995 has disclosed a composition comprising 70 to 90 parts by weight of a mixture of an isocyanate having a specific aromatic ring and a polythiol having at least three mercapto groups in one molecule and a sulfur content of 40% by weight or more, and 10 to 30 parts by weight of a compound having a functional group of at least one hydroxyl group or mercapto group in one molecule and at least a functional group of an acrylic group, a methacrylic group or a styryl group, and a plastic lens obtained by subjecting this composition to heat polymerization.

However, the surface of the plastic lens obtained from this composition has a low pencil hardness of 3H to 4H, and practical scratch resistance is still low. In addition, the polymerization time in the heat polymerization can be shortened, but a long period of about 4 hours is still taken. Thus, the further shortening of the polymerization time has been desired.

Moreover, Japanese Patent Application Laid-open No. 25240/1993 has suggested a lens composition comprising a polymer of a polyisocyanate compound, a polythiol compound and a polyene compound. In this publication, however, there is a description that the polyene compound is preferably used in an amount of 50% by weight, and if the amount of the polyene compound is decreased, sufficient heat resistance and surface hardness cannot be obtained. Besides, when the polyene compound is used in a described amount range, the impact resistance of the lens having a thickness of 1.5 mm is at most 36 g according to an iron ball drop test from a height of 127 cm, and judging from this value, the lens is not considered to possess the sufficient impact resistance. In addition, the obtained lens is breakable and does not have the practical scratch resistance.

SUMMARY OF THE INVENTION

An object of the present invention is to provide a sulfur-containing urethane-based resin which is excellent in heat resistance, impact resistance and scratch resistance.

Another object of the present invention is to provide a lens and an optical element comprising this resin.

Still another object of the present invention is to provide a composition for this resin which can be polymerized in a short period of time even by photopolymerization.

The present inventors have intensively investigated with the intention of achieving the above-mentioned objects, and as a result, there have been found a sulfur-containing urethane-based resin composition, a sulfur-containing urethane-based resin obtained by polymerizing this composition, an optical element comprising the resin, and a lens comprising the optical element.

That is to say, a sulfur-containing urethane-based resin composition of the present invention is directed to a sulfur-containing urethane-based resin composition which comprises a polythiol compound represented by formula (1):

wherein $X_1$, $X_2$ and $X_3$ each is a hydrogen atom or a mercapto group; x, y and z each is an integer of 0 to 8; and in their combinations, formula (1) has at least two mercapto groups, a polyiso(thio)cyanate compound, and a compound having two or more reactive unsaturated groups in an amount of 30 to 70% by weight based on the total weight of the composition, or a sulfur-containing urethane-based resin composition which comprises the polythiol compound represented by formula (1), the polyiso(thio)cyanate compound, the compound having two or more reactive unsaturated groups in an amount of 10 to 70% by weight based on the total weight, and a photopolymerization catalyst.

In particular, the composition desirably contains the compound having two or more reactive unsaturated groups in an amount of 30 to 50% by weight based on the total weight, and the compound having the reactive unsaturated groups preferably has neither a hydroxyl group nor a mercapto group. The composition may contain, in addition to the polythiol of formula (1), another polythiol compound or a thiol compound having a hydroxyl group. It is more preferable that the ratio between the polyiso(thio)cyanate compound, the compound having the reactive unsaturated groups, the polythiol of formula (1), and the other polythiol compound or the thiol compound having the hydroxyl group is such that a functional group molar ratio of {the iso(thio) cyanato group+ the reactive unsaturated group}/{the mercapto group+ the hydroxyl group} is in the range of 1.0 to 3.0.

From the resin composition of the present invention, the desired resin can be obtained in a short period of time by photopolymerization, and the thus obtained resin is suitable for a material for optical elements such as lenses for spectacles and cameras as well as a material for glazing materials, coating compositions and adhesives.

The sulfur-containing urethane-based plastic resin of the present invention has good optical properties and excellent impact resistance, heat resistance and scratch resistance, and it can be molded in a short time. Therefore, the plastic resin is industrially extremely useful.

DETAILED DESCRIPTION OF THE PREFERRED EMBODIMENTS

Next, the present invention will be described in detail.

The polyiso(thio)cyanate compound which can be used in the present invention includes polyisocyanate compounds and polyisothiocyanate compounds, and their typical compounds are as follows:

The polyisocyanate compound includes, for example, aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecatriisocyanate, 1,3,6-hexa-methylene triisocyanate, 1,8-diisocyanato-4-(isocyanatomethyl) octane, 2,5,7-trimethyl-1,8-diisocyanato-5-(isocyanatomethyl) octane, bis(isocyanatoethyl) carbonate, bis(isocyanatoethyl) ether, 1,4-butyleneglycoldipropylether-ω,ω'-diisocyanate, lysinediisocyanate methyl ester, lysine triisocyanate, 2-isocyanatoethyl-2,6-diisocyanatohexanoate, 2-isocyanatopropyl-2,6-diisocyanatohexanoate, xylylene diisocyanate, bis(isocyanatoethyl)benzene, bis-(isocyanatopropyl) benzene, α,α,α',α'-tetramethylxylylene diisocyanate, bis(isocyanatobutyl)benzene, bis(isocyanatomethyl) naphthalene, bis(isocyanatomethyl)diphenyl ether, bis(isocyanatoethyl) phthalate, mesitylene triisocyanate and 2,5-di(isocyanatomethyl)furan;

alicyclic polyisocyanates such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2'-dimethyldicyclohexylmethane diisocyanate, bis(4-isocyanato-n-butylidene) pentaerythritol, dimeric acid diisocyanate, 2-isocyanatomethyl-3-(3-isocyanatopropyl)-5-isocyanatomethyl-bicyclo [2.2.1]-heptane, 2-isocyanatomethyl-3-(3-isocyanatopropyl)-6-isocyanatomethyl-bicyclo-[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-3-(3-isocyanatopropyl)-6-(2-isocyanatoethyl)-bicyclo [2.1.1]-heptane, 2-isocyanatomethyl-2-(3-isocyanatopropyl)-5-(2-isocyanatoethyl)-bicyclo[2.2.1]-heptane and 2-isocyanatomethyl-2-(3-isocyanatopropyl)-6-(2-isocyanatoethyl)-bicyclo[2.2.1]-heptane;

aromatic polyisocyanates such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl) ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2', 4', 6'-pentaisocyanate, phenylisocyanatomethyl isocyanate, phenylisocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate and dichlorocarbazole diisocyanate;

sulfur-containing aliphatic polyisocyanates such as thiodiethyl diisocyanate, thiodipropyl diisocyanate, thiodihexyl diisocyanate, dimethylsulfone diisocyanate, dithiodimethyl diisocyanate, dithiodiethyl diisocyanate, dithiodipropyl diisocyanate and dicyclohexylsulfide-4,4'-diisocyanate;

aromatic sulfide-type polyisocyanates such as diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene) sulfide and 4,4'-methoxybenzenethioethyleneglycol-3,3'-diisocyanate;

aromatic disulfide-type polyisocyanates such as dipenyldisulfide-4,4'-diisocyanate, 2,2'-dimethyldiphenyldisulfide- 5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate;

aromatic sulfone-type polyisocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate, 4,4'-dimethoxybenzeneethylenedisulfone-3,3'-diisocyanate and 4,4'-dichlorodiphenylsulfone-3,3'-diisocyanate;

sulfonic ester-type polyisocyanates such as 4-methyl-3-isocyanatobenzenesulfonyl-4'-isocyanatophenol ester and 4-methoxy-3-isocyanatobenzenesulfonyl-4'-isocyanatophenol ester;

aromatic sulfonic amides such as 4-methyl-3-isocyanatobenzenesulfonylanilido-3'-methyl-4'-isocyanate, dibenzenesulfonyl-ethylenediamine-4,4'-diisocyanate, 4,4'-methoxybenzenesulfonyl-ethylenediamine-3,3'-diisocyanate and 4-methyl-3-isocyanatobenzenesulfonylanilido-4-methyl-3'-isocyanate; and sulfur-containing heterocyclic compounds such as thiophene-2,5-diisocyanate, thiophene-2,5-diisocyanatomethyl, 1,4-dithian-2,5-diisocyanate, 4,5-bis(isocyanatomethyl)-1,3-dithiorane, bis(isocyanatomethyl)tetrahydrothiophene and 2,5-bis(isocyanatomethyl)-1,4-dithian.

Halogenated derivatives such as chlorinated and brominated derivatives, alkylated derivatives, alkoxylated derivatives, nitrated derivatives, prepolymer type addition products with polyhydric alcohols, carbodiimide modified derivatives, urea-modified derivatives, biuret-modified derivatives and dimerized or trimerized products of these polyisocyanate compounds may also be used in the present invention.

The polyisothiocyanate compound used as a raw material in the present invention has two or more -NCS groups in the molecule and may also contain sulfur atom or atoms in addition to the isothiocyanate groups.

The polyisothiocyanate compound includes, for example, aliphatic polyisothiocyanates such as 1,2-diisothiocyanatoethane, 1,3-diisothiocyanatopropane, 1,4-diisothiocyanatobutane, 1,6-diisothiocyanatohexane and p-phenylenediisopropylidene diisothiocyanate;

alicyclic polyisothiocyanates such as cyclohexane diisothiocyanate;

aromatic polyisothiocyanates such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-diisothiocyanato-1,1'-biphenyl, 1,1'-methylenebis(4-isothiocyanatobenzene), 1,1'-methylenebis(4-isothiocyanato-2-methylbenzene), 1,1'-methylenebis(4-isothiocyanato-3-methylbenzene), 1,1'-(1,2-ethanediyl)-bis (4-isothiocyanatobenzene), 4,4'-diisothiocyanatobenzophenone, 4,4'-diisothiocyanato-3,3'-dimethylbenzophenone, benzanilido-3,4'-diisothiocyanate, diphenylether-4,4'-diisothiocyanate and diphenylamine-4,4'-diisothiocyanate;

heterocyclic polyisothiocyanates such as 2,4,6-triisothiocyanato-1,3,5-triazine; and carbonyl polyisothiocyanates such as hexanedioyl diisothiocyanate, nonanedioyl diisothiocyanate, carbonic diisothiocyanate, 1,3-benzenedicarbonyl diisothiocyanate, 1,4-benzenedicarbonyl diisothiocyanate and (2,2'-bipyridine)-4,4'-dicarbonyl diisothiocyanate.

The polyisothiocyanate having one or more sulfur atoms in addition to the isothiocyanate groups and two or more functional groups used as a raw material in the present invention includes, for example, sulfur-containing aliphatic polyisothiocyanates such as thiobis(3-isothiocyanatopropane), thiobis(2-isothiocyanatoethane) and dithiobis(2-isothiocyanatoethane);

sulfur-containing aromatic polyisothiocyanates such as 1-isothiocyanato- 4-[(2-isothiocyanato)sulfonyl]benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-[(4-isothiocyanatophenyl)sulfonyl]-2-methoxybenzene, 4-methyl-3-isothiocyanatobenzenesulfonyl-4'-isothiocyanate phenyl ester and 4-methyl-3-isothiocyanatobenzenesulfonylanilido-3'-methyl-4'-isothiocyanate; and sulfur-containing heterocyclic compounds such as thiophene-2,5-diisothiocyanate and 1,4-dithian-2,5-diisothiocyanate.

Further, halogenated derivatives such as chlorinated and brominated derivatives, alkylated derivatives, alkoxylated derivatives, nitrated derivatives, prepolymer type addition products with polyhydric alcohols, carbodiimide-modified derivatives, urea-modified derivatives, biuret-modified derivatives and dimerized and trimerized products of these polyisothiocyanate compounds may also be used in the present invention.

The isocyanato-containing polyisothiocyanate compound used as a raw material in the present invention includes, for example, aliphatic and alicyclic compounds such as 1-isocyanato-3-isothiocyanatopropane, 1-isocyanato-5-isothiocyanatopentane, 1-isocyanato-6-isothiocyanatohexane, isocyanatocarbonyl isothiocyanate and 1-isocyanato-4-isothiocyanatocylohexane;

aromatic compounds such as 1-isocyanato-4-isothiocyanatobenzene and 4-methyl-3-isocyanato-1-isothiocyanatobenzene;

heterocyclic compounds such as 2-isocyanato-4,5-diisothiocyanato-1,3,5-triazine; and compounds having sulfur atoms in addition to isothiocyanate groups such as 4-isocyanato-4'-isothiocyanatodiphenyl sulfide and 2-isocyanato-2'-isothiocyanatodiethyl disulfide.

Further, halogenated derivatives such as chlorinated and brominated derivatives, alkylated derivatives, alkoxylated derivatives, nitrated derivatives, prepolymer type addition products with polyhydric alcohols, carbodiimide-modified derivatives, urea-modified derivatives, biuret-modified derivatives and dimerized or trimerized products of these compounds may also be used in the present invention.

These polyiso(thio)cyanate compounds may be used singly or as a mixture of two or more thereof.

Among these compounds, tolylene diisocyanate, 4,4'-diphenylmethane diisocyanate, xylylene diisocyanate, naphthalene diisocyanate, $\alpha,\alpha,\alpha',\alpha'$-tetramethylxylylene diisocyanate, hexamethylene diisocyanate, dicyclohexylmethane diisocyanate, isophorone diisocyanate and bis(isocyanatomethyl)cyclohexane are preferable from the viewpoints of cost and easy availability. In particular, when xylylene diisocyanate or $\alpha,\alpha,\alpha',\alpha'$-tetramethylxylylene diisocyanate is used, a lens having a high refractive index and less yellowing properties can be particularly preferably obtained.

The polythiol compound which can be used in the present invention includes compounds represented by the above-mentioned formula (1), and examples of such compounds include 1-(1'-mercaptoethylthio)-2,3-dimercaptopropane, 1-(2'-mercaptopropylthio)-2,3-dimercaptopropane, 1-(3'-mercaptopropylthio)-2,3-dimercaptopropane, 1-(4'-mercaptobutylthio)-2,3-dimercaptopropane, 1-(5'-mercaptopentylthio)-2,3-dimercaptopropane, 1-(6'-mercaptohexylthio)-2,3-dimercaptopropane, 1,2-bis(○'-mercaptomethylthio)-3-mercaptopropane, 1,2-bis(2'-mercaptoethylthio)-3-mercaptopropane, 1,2-bis(3'-mercaptopropylthio)-3-mercaptopropane, 1,2-bis(4'-mercaptobutylthio)-3-mercaptopropane, 1,2-bis (5'- mercaptopentylthio)-3-mercaptopropane, 1,2-bis(6'-mercaptohexylthio)-3-mercaptopropane, 1,2,3-tris(1'-mercaptomethylthio) propane, 1,2,3-tris(2'-mercaptoethylthio) propane, 1,2,3-tris(3'-mercaptopropylthio)propane, 1,2,3-tris(4'-mercaptobutylthio)propane, 1,2,3-tris(5'-mercaptopentylthio) propane and 1,2,3-tris(6'-mercaptohexylthio) propane.

Furthermore, for the purpose of improving the resin in compliance with its use purpose, a compound having an active hydrogen group such as another thiol group or a hydroxyl group may be used together with the above polythiol compound. Examples include aliphatic polythiols such as methanedithiol, 1,2-ethanedithiol, 1,1-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 3,6-dioxaoctane-1,8-dimercaptan, 2-methylcyclohexane-2,3-dithiol, bicyclo [2.2.1]-hepta-exo-cis-2,3-dithiol, 1,1-bis (mercaptomethyl)cyclohexane, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptopropionate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis (mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate) and pentaerythritol tetrakis(3-mercaptopropionate);

aromatic polythiols such as 1,2-dimercaptobenzene, 1,3-dimercaptobenzene, 1,4-dimercaptobenzene, 1,2-bis-(mercaptomethyl) benzene, 1,3-bis(mercaptomethyl) benzene, 1,4-bis(mercaptomethyl)benzene, 1,2-bis (mercaptoethyl)benzene, 1,3-bis(mercaptoethyl)benzene, 1,4-bis(mercaptoethyl) benzene, 1,2-bis (mercaptomethyloxy)benzene, 1,3-bis (mercaptomethyloxy)benzene, 1,4-bis (mercaptomethyloxy) benzene, 1,2-bis (mercaptoethyloxy)benzene, 1,3-bis(mercaptoethyloxy) benzene, 1,4-bis(mercaptoethyloxy)-benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris (mercaptomethyl) benzene, 1,2,3-tris(mercaptoethyl) benzene, 1,2,4-tris(mercaptoethyl)benzene, 1,3,5-tris (mercaptoethyl) benzene, 1,2,3-tris (mercaptomethyleneoxy)benzene, 1,2,4-tris (mercaptomethyleneoxy)benzene, 1,3,5-tris (mercaptomethyleneoxy) benzene, 1,2,3,4-tetramercaptobenzene, 1,2,3,5-tetramercaptobenzene, 1,2,4,5-tetramercaptobenzene, 1,2,3,4-tetrakis (mercaptomethyl)benzene, 1,2,3,5-tetrakis (mercaptomethyl)benzene, 1,2,4,5-tetrakis (mercaptomethyl) benzene, 1,2,3,4-tetrakis (mercaptoethyl)benzene, 1,2,3,5-tetrakis(mercaptoethyl) benzene, 1,2,4,5-tetrakis (mercaptoethyl)benzene, 1,2,3, 4-tetrakis(mercaptomethyleneoxy) benzene, 1,2,3,5-tetrakis(mercaptomethyleneoxy) benzene, 1,2,4,5-tetrakis (mercaptomethyleneoxy)benzene, 1,2,3,4-tetrkis (mercaptoethyleneoxy)benzene, 1,2,3,5-tetrakis (mercaptoethyleneoxy)benzene, 1,2,4,5-tetrakis (mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl) propane-2,2-dithiol, 1,3-diphenylpropane-2,2-dithiol, phenylmethane-1,1-dithiol and 2,4-di(p-mercaptophenyl) pentane;

halogenated aromatic polythiols including chlorinated or brominated polythiols such as 2,5-dichlorobenzene-1,3-dithiol, 1,3-di(p-chlorophenyl)propane-2,2-dithiol, 3,4,5-tribromo-1,2-dimercaptobenzene and 2,3,4,6-tetrachloro-1,5-bis(mercaptomethyl)benzene;

heterocyclic ring-containing polythiols such as 2-methylamino-4,6-dithiol-sym-triazine, 2-ethylamino-4,6-dithiol-sym-triazine, 2-amino-4,6-dithiol-sym-triazine, 6-dithiol-sym-triazine, 2-amino-4,6-dithiol-sym-triazine, 2-morphorino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thio-benzeneoxy-4,6-dithiol-sym-triazine and 2-thiobutyloxy-4,6-dithiol-sym-triazine;

aromatic polythiols such as 1,2-bis(mercaptomethylthio) benzene, 1,3-bis(mercaptomethylthio)benzene, 1,4-bis (mercaptomethylthio) benzene, 1,2-bis (mercaptoethylthio)benzene, 1,3-bis(mercaptoethylthio) benzene, 1,4-bis(mercaptoethylthio) benzene, 1,2,3-tris (mercaptomethylthio) benzene, 1,2,4-tris (mercaptomethylthio)benzene, 1,3,5-tris (mercaptomethylthio)benzene, 1,2,3-tris (mercaptoethylthio) benzene, 1,2,4-tris (mercaptoethylthio) benzene, 1,3,5-tris (mercaptoethylthio)benzene, 1,2,3,4-tetrakis (mercaptomethylthio)benzene, 1,2,3,5-tetrakis (mercaptomethylthio)benzene, 1,2,4,5-tetrakis (mercaptomethylthio) benzene, 1,2,3,4-tetrakis (mercaptoethylthio) benzene, 1,2,3,5-tetrakis (mercaptoethylthio)benzene, 1,2,4,5-tetrakis (mercaptoethylthio)benzene and aromatic ring alkylated derivatives of these polythiols;

aliphatic polythiols having a sulfur atom(s) in addition to the mercapto group such as bis(mercaptomethyl) sulfide, bis (mercaptoethyl) sulfide, bis(mercaptopropyl) sulfide, bis (mercaptomethylthio)methane, bis(2-mercaptoethylthio) methane, bis(3-mercaptopropylthio)methane, 1,2-bis (mercaptomethylthio)ethane, 1,2-bis(2-mercaptoethylthio) ethane, 1,2-bis(3-mercaptopropylthio) ethane, 1,3-bis (mercaptomethylthio)propane, 1,2-bis(2-mercaptoethylthio) propane, 1,2-bis(3-mercaptoethylthio) propane, 1,2,3-tris (mercaptomethylthio)propane, 1,2,3-tris(2-mercaptoethylthio) propane, 1,2,3-tris(3-mercaptopropylthio)propane, tetrakis (mercaptomethylthiomethyl)methane, tetrkis(2-mercaptoethylthiomethyl) methane, tetrakis(3-mercaptopropylthiomethyl) methane, bis(2,3-dimercaptopropyl) sulfide, 2,5-dimercapto-1,4-dithian, bis-(mercaptomethyl) disulfide, bis(mercaptoethyl) disulfide and bis(mercaptopropyl) disulfide, esters of thioglycolic acid and mercaptopropionic acid with these compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3- mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-diol bis(3-mercaptopropionate), thioglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thioglycolic acid bis(2,3-dimercaptopropyl ester), thiodipropionic acid bis(2,3-dimercaptopropyl ester), dithiodiglycolic acid bis(2,3-dimercaptopropyl ester) and dithiodipropionic acid bis(2,3-dimercaptopropyl ester); and heterocyclic compounds containing a sulfur atom(s) in addition to the mercapto group such as 3,4-thiophenedithiol, 2,5-bis (mercaptomethyl)tetrahydrothiophene, bis (mercaptomethyl)-1,3-dithiolan, 2,5-dimercapto-1,3,4-thiadiazol, 2,5-dimercapto-1,4-dithian and 2,5-dimercaptomethyl-1,4-dithian.

Further, hydroxy-containing polythiol compounds include, for examplethioglycerol, 2,3-such as thioglycerol, 2,3-dihydroxy-1-mercaptobutane, 2,3-dihydroxy-1-mercaptopentane, 3,4-dihydroxy-1-mercaptobutane, 3,4-dihydroxy-1-mercaptopentane and 3,4-dihydroxy-1-mercaptohexane; and dimercaptoalcohols such as 2-hydroxy-1,3-dimercaptopropane, 1-hydroxy-2,3-dimercaptopropane, 2-hydroxy-1,3-dimercaptobutane, 1-hydroxy-2,3-dimercaptobutane, 2-hydroxy-1,3-dimercaptoheptane, 2-hydroxy-1,3-dimercaptohexane, 3-hydroxy-1,4-dimercaptobutane, 3-hydroxy-1,4-dimercaptoheptane and 3-hydroxy-1,4-dimercaptohexane.

The compound having two or more reactive unsaturated groups in one molecule which can be used in the present invention is a compound having two or more acrylic groups, methacrylic groups, vinyl groups or allyl groups in all in one molecule, and this compound may have the same reactive unsaturated groups or the different reactive unsaturated groups.

These compounds can be roughly classified into (A) acetal compounds, (B) bisphenol compounds, (C) isocyanuric acid derivatives, (D) triazine compounds, (E) other polyvalent alcohol or polyvalent thiol derivatives, and (F) other compounds. Next, these compounds in the thus classified groups will be described group by group.

(A) Acetal compounds:

The acetal compounds which can be used in the present invention are unsaturated cycloacetal compounds each having at least two of unsaturated cycloacetal groups represented by (unsaturated dioxane type)

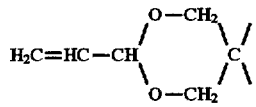

and/or (unsaturated dioxolane type)

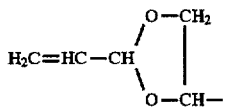

in one molecule.

Examples of the acetal compounds which can be suitably utilized in a polysulfide resin composition of the present invention include compounds mentioned in the following (i) to (v):

(i) Diallylidenepentaerythritol, triallylidenesorbitol, diallylidene-2,2,6,6-tetramethylolcyclohexanone or a mixture thereof.

(ii) A reaction product of diallylidenepentaerythritol and/or diallylidene-2,2,6,6-tetramethylolcyclohexanone with (a) a polyol such as ethylene glycol, triethylene glycol, propylene glycol, dipropylene glycol, 1,3-butanediol, 1,6-hexanediol, polyethylene glycol, hydrogenated bisphenol A, bisphenol A-ethylene oxide adduct, bisphenol A-propylene oxide adduct, trimethylolpropane, trimethylolethane, pentaerythritol, dipentaerythritol, an ethylene oxide adduct of phthalic acid, isophthalic acid or terephthalic acid, or a polyester having a molecular weight of 1500 or less and a terminal hydroxide group; (b) a polythiol such as dithioglycol, dipentenedimercaptan, ethylcyclohexyldimercaptan or 1,6-hexanedimercaptan, or a compound having two or more of a hydroxyl group(s) and/or a mercapto group(s) in all in one molecule such as an ester compound obtained by reacting thioglycollic acid, β-mercaptopropionic acid or mercaptosuccinic acid with the above-mentioned polyol; (c) a phenol such as phenol, cresol, or novolak obtained by formalin condensation thereof, bisphenol F or bisphenol A; (d) an arylsulfonamide such as benzenesulfonamide, o-toluenesulfonamide or chlorobenzenesulfonamide; or (e) a mixture thereof.

(iii) A reaction product of monoallylidenetrimethylolpropane and/or monoallylidenetrimethylolpropane with an isocyanate compound such as tolylene diisocyanate, polyalkyleneallyl isocyanate, metaphenylene diisocyanate or isophorone diisocyanate.

(iv) An addition half-esterified product of monoallylidenetrimethylolpropane and/or monoallylidenetrimethylolethane with succinic anhydride, maleic anhydride, itaconic anhydride, phthalic anhydride, tetrahydrophthalic anhydride or hexahydrophthalic anhydride.

(v) A compound obtained by reacting an addition half-esterified product of monoallylidenetrimethylolpropane and/or monoallylidenetrimethylolethane with a carboxylic anhydride, with an epoxy compound such as a polyvalent glycidyl ester type epoxy compound or a glycidyl ester type epoxy compound of phthalic acid, adipic acid or a dimeric acid.

(B) Bisphenol compounds:

The bisphenol compounds which can be used in the present invention are bisphenols each having at least two of a vinyl group, an acryloyl group, a metaacryloyl group, an allyloxy group, an allylcarbonate group or the like in all in one molecule. Examples of the bisphenol compounds which can be utilized in the present invention include compounds represented by formula (2)

$$(R_1)_{p1}-A-(R_2)_{p2} \qquad (2)$$

wherein each of p1 and p2 is an integer of 1 to 4; and A is a group having any of the following structures (a) to (f):

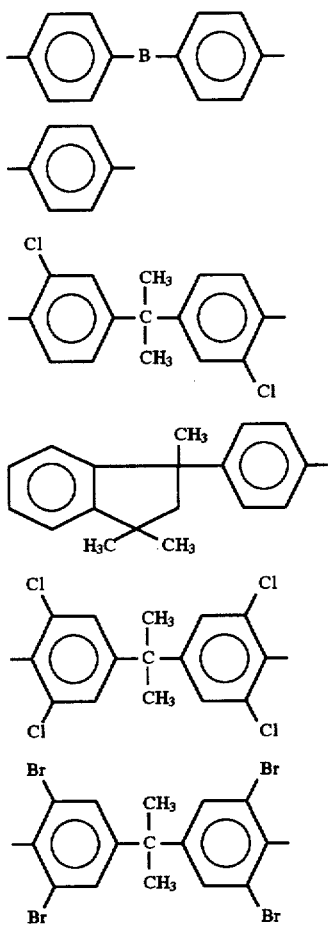

Here, B in the formula (a) represents a linking group having any of the structures (g) to (o):

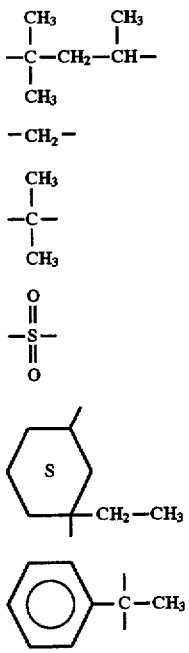

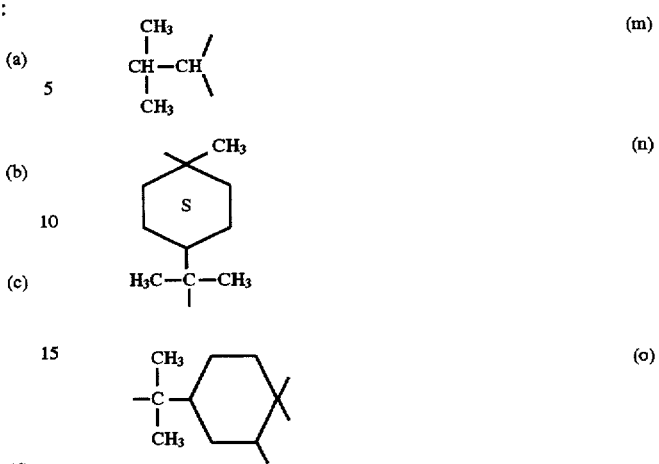

Furthermore, each of $R_1$ and $R_2$ in formula (2) is a glycidyloxy group or a group having the structure represented by formula (3):

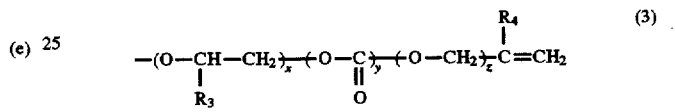

wherein each of $R_3$ and $R_4$ is a hydrogen atom, a methyl group, an ethyl group, a chloromethyl group or a bromomethyl group; x is an integer of 0 to 5; and each of y and z is 0 or 1.

Typical examples of the bisphenol compounds include bisphenol A diacrylate, bisphenol F diacrylate, bisphenol S diacrylate, tetrabromobisphenol A diacrylate, tetrabromobisphenol F diacrylate, tetrabromobisphenol S diacrylate, ethoxylated bisphenol A diacrylate, ethoxylated bisphenol F diacrylate, ethoxylated bisphenol S diacrylate, ethoxylated tetrabromobisphenol A diacrylate, ethoxylated tetrabromobisphenol F diacrylate, ethoxylated tetrabromobisphenol S diacrylate, propoxylated bisphenol A diacrylate, propoxylated bisphenol F diacrylate, propoxylated bisphenol S diacrylate, propoxylated bisphenol A-bis (hydroxypropylacrylate), ethoxylated hydrogenated bisphenol A diacrylate, allyl methacrylate, methacryloxy ethylene glycol vinyl ether, allylated cyclohexyl dimethacrylate, methoxylated cyclohexyl dimethacrylate, neopentyl glycol-modified trimethylolpropane dimethacrylate, tris (methacryloxyethyl) isocyanurate, bis(methacyloxyethyl) hydroxyethyl isocyanurate, bis(methacyloxyethyl) alkoxyethyl isocyanurate, caprolactone-modified tris (methacryloxyethyl) isocyanurate, bisphenol A dimethacrylate, bisphenol F dimethacrylate, bisphenol S dimethacrylate, tetrabromobisphenol A dimethacrylate, tetrabromobisphenol F dimethacrylate, tetrabromobisphenol S dimethacrylate, ethoxylated bisphenol A dimethacrylate, ethoxylated bisphenol F dimethacrylate, ethoxylated bisphenol S dimethacrylate, ethoxylated tetrabromobisphenol A dimethacrylate, ethoxylated tetrabromobisphenol F dimethacrylate, ethoxylated tetrabromobisphenol S dimethacrylate, propoxylated bisphenol A dimethacrylate, propoxylated bisphenol F dimethacrylate, propoxylated bisphenol S dimethacrylate and propoxylated bisphenol A-bis(hydroxy-propyl methacrylate).

(C) Isocyanuric acid derivatives:

The isocyanuric acid derivatives which can be used in the present invention are the derivatives of isocyanuric acid which have at least two of an acryloyl group, a methacryloyl group, an allyloxy group and an allylcarbonate group in one molecule. Examples of the isocyanuric acid derivatives which can be utilized in the present invention include isocyanuric acid derivatives obtained by reacting polyvalent alcohols represented by the following (i) to (iii) with acrylic acid, methacrylic acid, allyl chloroformate, allyl alcohol, halogenated allyls, glycidyl acrylate and glycidyl methacrylate, and glycidyl-esterified product of isocyanuric acid.

(i) A polyvalent alcohol obtained by adding an alkylene oxide such as ethylene oxide or propylene oxide to isocyanuric acid.

(ii) A polyvalent alcohol obtained by adding epichlorohydrin to isocyanuric acid, followed by dehydrochlorination.

(iii) A polyvalent alcohol obtained by introducing methylol into a reaction product of isocyanuric acid and acrylamide.

Typical examples of these isocyanuric acid derivatives include tris(2-acryloyloxyethyl) isocyanurate, tris(2-methacryloyloxyethyl) isocyanurate, di(2-acryloyloxyethyl)-2-hydroxyethyl isocyanurate, di(2-methacryloyloxyethyl)-2-hydroxyethyl isocyanurate, di(2-acryloyloxyethyl)-2-acetoxyethyl isocyanurate, di(2-methacryloyloxyethyl)-2-acetoxyethyl isocyanurate, di(2-acryloyloxyethyl) allyl isocyanurate, di(2-methacryloyloxyethyl)allyl isocyanurate and triallyl isocyanurate.

(D) Triazine compounds:

The triazine compounds which can be used in the present invention are triazine compounds having at least two of an acryloyl group, a methacryloyl group, an allyloxy group and an allylcarbonate group in one molecule, compounds represented by formula (4), and compounds obtained by oligomerizing them via formalin, a polyvalent alcohol or ethylene oxide:

(4)

wherein each of $R_5$, $R_6$ and $R_7$ is a hydrogen atom, an alkyl group, a (meth)acryl-modified alkoxy group or

wherein each of $R_8$ and $R_9$ is a hydrogen atom, an alkyl group such as a methyl group, an ethyl group or a propyl group, an aromatic alkyl group such as a benzyl group, a glycidyl group or a group represented by the above-mentioned formula (3).

Typical examples of these triazine compounds include (i) N,N'-bis((meth)acryloylmethyl)-N,N',N'',N''-tetrakis(methoxymethyl)melamine and N,N',N'',N''-tetrakis((meth)acryloylmethyl)-N,N'-bis(ethoxymethyl)melamine, (ii) N,N,N',N',N'',N''-hexakis(2-(meth)acryloylethoxymethyl) melamine, (iii) 2,4-bis[N,N-bis[(2-(meth)acryloylethoxy)-ethoxymethyl]amino]-6-ethoxy-1,3,5-triazine, (iv) 2,4-bis[p-(2-(meth)acryloylethoxy)phenyloxy]-6-[N,N-bis[(2-(meth)acryloylethoxy)ethoxymethyl] amino]-6-ethoxy-1,3,5-triazine, and (v) 2,2-bis[4-[N,N',N''-tris(methoxymethyl)-N',N''-[(2-(meth)acryloylethoxy)methyl]melaminyloxy]phenyl] propane.

Furthermore, examples of the polyvalent alcohol for use in the oligomerization include ethylene glycol, diethylene glycol, propylene glycol, 1,3-butanediol, 1,6-hexanediol, hydrogenated bisphenol A, trimethylolpropane, pentaerythritol, and ethylene oxide adducts of phthalic acid, isophthalic acid or terephthalic acid.

(E) Other polyvalent alcohol or polyvalent thiol derivatives:

Examples of the polyvalent alcohol derivatives other than mentioned above which can be used in the present invention include products obtained by reacting polyvalent alcohols with acrylic acid, methacrylic acid, allyl chloroformate, allyl alcohol, halogenated allyls, glycidyl acrylate and glycidyl methacrylate. Examples of the polyvalent alcohols include the compounds mentioned in the following (i) and (ii):

(i) Aliphatic polyvalent alcohols such as ethylene glycol, trimethylolpropane, pentaerythritol, propylene glycol, glycerin, sorbitol, neopentyl glycol, dichloroneopentyl glycol and dipentaerythritol. Typical examples of products obtained by reacting these polyvalent alcohols with acrylic acid, methacrylic acid, allyl chloroformate, allyl alcohol, halogenated allyls, glycidyl acrylate and glycidyl methacrylate include ethylene glycol diacrylate, propylene glycol diacrylate, 1,4-butanediol diacrylate, 1,3-butylene glycol diacrylate, 1,5-pentanediol diacrylate, neopentyl glycol diacrylate, 1,6-hexanediol diacrylate, 1,7-heptanediol diacrylate, 1,8-octanediol diacrylate, decanediol diacrylate, tetradecanediol diacrylate, pentadecanediol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, tetrapropylene glycol diacrylate, polypropylene glycol diacrylate, bis(acryloxyneopentyl glycol) adipate, hydroxypivalic acid ester neopentyl glycol diacrylate, glycerin diacrylate, glycerin triacrylate, methacryloyl glycerin acrylate, triglycerol diacrylate, diethylene glycol bis(hydroxypropyl acrylate), trimethylolpropane diacrylate, trimethylolpropane triacrylate, ethoxylated trimethylolpropane triacrylate, hydroxypropylated trimethylolpropane triacrylate, ethylene oxide-modified trimethylolpropane triacrylate, propylene oxide-modified trimethylolpropane triacrylate, di(trimethylolpropane) tetraacrylate, pentaerythritol triacrylate, pentaerythritol tetraacrylate, stearic acid-modified pentaerythritol diacrylate, dipentaerythritol hexacrylate, dipentaerythritol monohydroxypentaacrylate, alkylated dipentaerythritol pentaacrylates, dialkylated dipentaerythritol tetraacrylates, trialkylated dipentaerythritol tetraacrylates, caprolactone-modified dipentaerythritol hexaacrylate, dicyclopentanyl diacrylate, dicyclopentanyloxyethyl diacrylate, dicyclopentanylmethyl diacrylate, ethoxylated hydrogenated bisphenol A diacrylate, allyl acrylate, acryloxytriethylene glycol vinyl ether, allylated cyclohexyl diacrylate, methoxylated cyclohexyl diacrylate, neopentyl glycol-modified trimethylolpropane diacrylate, ethylene glycol dimethacrylate, propylene glycol dimethacrylate, 1,4-butanediol dimethacrylate, 1,3-butylene glycol dimethacrylate, 1,5-pentanediol dimethacrylate, neopentyl glycol dimethacrylate, 1,6-hexanediol dimethacrylate, 1,7-heptanediol dimethacrylate, 1,8-octanediol dimethacrylate, decanediol dimethacrylate, tetradecanediol dimethacrylate, pentadecanediol dimethacrylate, diethylene glycol dimethacrylate, triethylene glycol dimethacrylate, tetraethylene glycol dimethacrylate, polyethylene glycol dimethacrylate, dipropylene glycol dimethacrylate, tripropylene glycol dimethacrylate, tetrapropylene glycol dimethacrylate, polypropylene glycol dimethacrylate, bis (methacryloxyneopentyl glycol) adipate, hydroxypivalic acid ester neopentyl glycol dimethacrylate, glycerin dimethacrylate, glycerin trimethacrylate, triglycerol dimethacrylate, diethylene glycol bis (hydroxypropyl methacrylate), trimethylolpropane dimethacrylate, trimethylolpropane trimethacrylate, ethoxylated trimethylolpropane trimethacrylate, hydroxypropylated trimethylolpropane trimethacrylate, ethylene oxide-modified trimethylolpropane trimethacrylate, propylene oxide-modified trimethylolpropane trimethacrylate, ditrimethylolpropane tetramethacrylate, pentaerythritol trimethacrylate, pentaerythritol tetramethacrylate, stearic acid-modified pentaerythritol dimethacrylate, dipentaerythritol hexamethacrylate, dipentaerythritol monohydroxypentamethacrylate, alkylated dipentaerythritol pentamethacrylates, dialkylated dipentaerythritol tetramethacrylates, trialkylated dipentaerythritol trimethacrylates, caprolactone-modified dipentaerythritol hexamethacrylate, dicyclopentanyl dimethacrylate, dicyclopentanyloxyethyl dimethacrylate and dicyclopentanylmethyl dimethacrylate.

(ii) Sulfur-containing polyvalent alcohols such as [4-(hydroxyethoxy)phenyl] sulfide, [4-(hydroxypropoxy) phenyl] sulfide, bis[4-(2,3-dihydroxypropoxy)phenyl] sulfide, bis[4-(4-hydroxycyclohexyloxy)phenyl] sulfide, bis[2-methyl-4-(hydroxyethoxy)-6-butylphenyl] sulfide, di(2-hydroxyethyl) sulfide, 1,2-bis(2-hydroxyethylmercapto)ethane, bis(2-hydroxyethyl) disulfide, 1,4-dithian-2,5-diol, bis(2,3-dihydroxypropyl)sulfide, tetrakis(4-hydroxy-2-thiabutyl) methane, 4,4-thiobis(6-tert-butyl-3-methylphenol) and 1,3-bis(2-hydroxyethylthioethyl) cyclohexane, and polyvalent alcohols obtained by adding alkylene oxides such as ethylene oxide and propylene oxide to the above-mentioned polyvalent alcohols.

Examples of the polyvalent thiol derivatives which can be used in the present invention include products obtained by reacting polyvalent thiols with acrylic acid, methacrylic acid, allyl chloroformate, allyl alcohol, halogenated allyls, glycidyl acrylate and glycidyl methacrylate, and products obtained by the glycidyl-sulfidation of the polyvalent thiols. Here, examples of the polyvalent thiols include polythiols, compounds each having at least one sulfur atom in addition to a mercapto group, mercapto compounds each having a hydroxyl group, and compounds each having the hydroxyl group and at least one sulfur atom in addition to the mercapto group.

Examples of the polythiols include aliphatic polythiols such as methanedithiol, 1,2-ethanedithiol, 1,1-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, bicyclo[2.2.1]-hepta-exo-cis-2,3-dithiol, 1,1-bis (mercaptomethyl)cyclohexane, thiomalic acid bis(2-mercaptoethyl ester), 2,3-dimercaptosuccinic acid (2-mercaptoethyl ester), 2,3-dimercapto-1-propanol (2-mercaptoacetate), 2,3-dimercapto-1-propanol (3-mercaptoacetate), diethylene glycol bis(2-mercaptoacetate), diethylene glycol bis(3-mercaptopropionate), 1,2-dimercaptopropyl methyl ether, 2,3-dimercaptopropyl methyl ether, 2,2-bis (mercaptomethyl)-1,3-propanedithiol, bis(2-mercaptoethyl) ether, ethylene glycol bis(2-mercaptoacetate), ethylene glycol bis(3-mercaptopropionate), trimethylolpropane bis(3-mercaptopropionate) and pentaerythritol tetrakis(3-mercaptopropionate), and halogen-substituted compounds thereof such as chlorine-substituted and bromine-substituted compounds; aromatic polythiols such as 1,2-dimercaptobenzene, 1,3-dimercaptobenzene, 1,4-dimercaptobenzene, 1,2-bis(mercaptomethyl) benzene, 1,3-bis(mercaptomethyl)benzene, 1,4-bis(mercaptomethyl) benzene, 1,2-bis(mercaptoethyl)-benzene, 1,3-bis(mercaptoethyl)benzene, 1,4-bis(mercaptoethyl) benzene, 1,2-bis(mercaptomethyleneoxy)benzene, 1,3-bis (mercaptomethyleneoxy)benzene, 1,4-bis (mercaptomethyleneoxy) benzene, 1,2-bis (mercaptoethyleneoxy)benzene, 1,3-bis (mercaptoethyleneoxy)benzene, 1,4-bis (mercaptoethyleneoxy) benzene, 1,2,3-trimercaptobenzene, 1,2,4-trimercaptobenzene, 1,3,5-trimercaptobenzene, 1,2,3-tris(mercaptomethyl) benzene, 1,2,4-tris(mercaptomethyl) benzene, 1,3,5-tris (mercaptomethyl)benzene, 1,2,3-tris (mercaptoethyl)benzene, 1,2,4-tris(mercaptoethyl)benzene, 1,3,5-tris(mercaptoethyl) benzene, 1,2,3-tris (mercaptomethyleneoxy) benzene, 1,2,4-tris (mercaptomethyleneoxy)benzene, 1,3,5-tris (mercaptomethyleneoxy)benzene, 1,2,3-tris (mercaptoethyleneoxy) benzene, 1,2,4-tris (mercaptoethyleneoxy) benzene, 1,3,5-tris (mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl) benzene, 1,2,3,5-tetrakis(mercaptomethyl)benzene, 1,2,4,5-tetrakis(mercaptomethyl)benzene, 1,2,3,4-tetrakis (mercaptoethyl) benzene, 1,2,3,5-tetrakis(mercaptoethyl) benzene, 1,2,4,5-tetrakis(mercaptoethyl)benzene, 1,2,3,4-tetrakis (mercaptomethyleneoxy)benzene, 1,2,3,5-tetrakis-(mercaptomethyleneoxy) benzene, 1,2,4,5-tetrakis (mercaptomethyleneoxy) benzene, 1,2,3,4-tetrkis (mercaptoethyleneoxy) benzene, 1,2,3,5-tetrakis (mercaptoethyleneoxy)benzene, 1,2,4,5-tetrakis (mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl) propane-2,2-dithiol, 1,3-diphenylpropane-2,2-dithiol, phenylmethane-1,1-dithiol and 2,4-di(p-mercaptophenyl) pentane;

halogenated aromatic polythiols including chlorinated and brominated aromatic polythiols such as 2,5-dichlorobenzene-1,3-dithiol, 1,3-di(p-chlorophenyl) propane-2,2-dithiol, 3,4,5-tribromo-1,2-dimercaptobenzene and 2,3,4,6-tetra-chloro-1,5-bis (mercaptomethyl)benzene;

heterocyclic polythiols such as 2-methylamino-4,6-dithiol-sym-triazine, 2-ethylamino-4,6-dithiol-sym-triazine, 2-amino-4,6-dithiol-sym-triazine, 2-morphorino-4,6-dithiol-sym-triazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiol-sym-triazine, 2-thiobutyloxy-4,6-dithiol-sym-triazine and 2-thiobutyloxy- 4,6-dithiol-sym-triazine, and halogen-substituted compounds thereof such as chlorine-substituted and bromine-substituted compounds.

Examples of the polythiol having at least one sulfur atom in addition to the mercapto group include aromatic polythiols such as 1,2-bis(mercaptomethylthio)benzene, 1,3-bis (mercaptomethylthio)benzene, 1,4-bis(mercaptomethylthio) benzene, 1,2-bis(mercaptoethylthio)benzene, 1,3-bis (mercaptoethylthio)benzene, 1,4-bis(mercaptoethylthio) benzene, 1,2,3-tris(mercaptomethylthio)benzene, 1,2,4-tris (mercaptomethylthio)benzene, 1,3,5-tris (mercaptomethylthio) benzene, 1,2,3-tris (mercaptoethylthio) benzene, 1,2,4-tris(mercaptoethylthio) benzene, 1,3,5-tris(mercaptoethylthio)benzene, 1,2,3,4-tetrakis(mercaptomethylthio) benzene, 1,2,3,5-tetrakis (mercaptomethylthio)benzene, 1,2,4,5-tetrakis (mercaptomethylthio)benzene, 1,2,3,4-tetrakis (mercaptoethylthio)benzene, 1,2,3,5-tetrakis (mercaptoethylthio)benzene, 1,2,4,5-tetrakis (mercaptoethylthio)benzene and aromatic ring alkylated derivatives of these polythiols; aliphatic polythiols such as bis(mercaptomethyl) sulfide, bis(mercaptoethyl) sulfide, bis (mercaptopropyl) sulfide, bis(mercaptomethylthio)methane, bis(2-mercaptoethylthio) methane, bis(3-mercaptopropylthio)methane, 1,2-bis (mercaptomethylthio) ethane, 1,2-bis(2-mercaptoethylthio) ethane, 1,2-bis(3-mercaptopropylthio)ethane, 1,3-bis (mercaptomethylthio) propane, 1,2-bis(2-mercaptoethylthio) propane, 1,2-bis(3-mercaptopropylthio)propane, 1,2,3-tris (mercaptomethylthio)propane, 1,2,3-tris(2-mercaptoethylthio) propane, 1,2,3-tris(3-mercaptopropylthio) propane, tetrakis (mercaptomethylthiomethyl)methane, tetrkis(2-mercaptoethylthiomethyl)methane, tetrakis(3-mercaptopropylthiomethyl) methane, bis(2,3-dimercaptopropyl) sulfide, 2,5-dimercapto-1,4-dithian, bis (mercaptomethyl) disulfide, bis(mercaptoethyl) disulfide and bis(mercaptopropyl) disulfide, esters of thioglycolic acid and mercaptopropionic acid with these compounds, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-diol bis(3-mercaptopropionate), thioglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester) and dithiodipropionic acid bis(2,3-dimercaptopropyl ester), and halogen-substituted compounds thereof such as chlorine-substituted and bromine-substituted compounds; and heterocyclic compounds having the sulfur atom in addition to the mercapto group such as 3,4-thiophenedithiol, 2,5-bis (mercaptomethyl)tetrahydrothiophene, bis(mercaptomethyl) -1,3-dithiolan, 2,5-dimercapto-1,3,4-thiadiazol, 2,5-dimercapto-1,4-dithan and 2,5-dimercaptomethyl-1,4-dithian, and halogen-substituted compounds thereof such as chlorine-substituted and bromine-substituted compounds.

Further, hydroxy-containing mercapto compounds include, for example, 2-mercaptoethanol, 3-mercapto-1,2-propanediol, glycerindi(mercaptoacetate), 1-hydroxy-4-mercaptocyclohexane, 2,4-dimercaptophenol, 2-mercaptohydroquinone, 4-mercaptophenol, 1,2-dimercapto-2-propanol, 1,3-dimercapto-2-propanol, 2,3-dimercapto-1-propanol, 1,2-dimercapto-1,3-butanediol, pentaerythritoltris(3-mercaptopropionate), pentaerythritolmono(3-mercaptopropionate), pentaerythritolbis(3-mercaptopropionate), pentaerythritoltris (thioglycolate), pentaerythritoltetrakis(3-mercaptopropionate), and halogen-substituted compounds thereof such as chlorine-substituted and bromine-substituted compounds.

Examples of the compound having the hydroxyl group and at least one sulfur atom in addition to the mercapto group include hydroxymethyltris(mercaptoethylthiomethyl) methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfidemono(3-mercaptopropionate), dimercaptoethane mono(salicylate) and hydroxyethylthiomethyl tris(mercaptoethylthiomethyl) methane, halogen-substituted compounds thereof such as chlorine-substituted and bromine-substituted compounds, and polythiols obtained by adding alkylene oxide such as ethylene oxide and propylene oxide thereto.

(F) Other compounds:
Examples of the other compounds include
(i) Allyl esters and methallyl esters of polyvalent carboxylic acids such as diallyl phthalate, diallyl isophthalate, diallyl succinate, thiodiacetic acid, thiodipropionic acid, dithiodiacetic acid, dithiodipropionic acid and malic acid,
(ii) Vinyl compounds such as divinylbenzene, trivinylbenzene, divinylcyclohexane, trivinylcyclohexane, vinylcyclohexane, divinyl ether, hydroxymethylstyrene, mercaptomethylstyrene and divinyl adipate,
(iii) Reaction products of polyisocyanates such as isophorone diisocyanate, xylylene diisocyanate, tolylene diisocyanate and 4,4'-methylenebis(phenyl isocyanate) with alcohols having unsaturated bonds such as allyl alcohol and hydroxyethyl (meth)acrylate,
(iv) Polyolefin compounds such as dicyclopentadiene and dibutene,
(v) Acrylic acid esters such as bis(acryloyloxyethoxy) hydroxyphosphine oxide, tris(acryloyloxyethoxy) hydroxyphosphine oxide, bis (acryloyloxyethoxybutoxy)hydroxyphosphine oxide and tris(acryloyloxyethoxybutoxy)hydroxyphosphine oxide; and methacrylic acid esters such as bis (methacryloyloxyethoxy)hydroxyphosphine oxide, tris (methacryloyloxyethoxy)hydroxyphosphine oxide, bis (methacryloyloxyethoxybutoxy)hydroxyphosphine oxide and tris(methacryloyloxyethoxybutoxy) hydroxyphosphine oxide,
(vi) Diallyl compounds such as diallyl ether, diallyl sulfide and diallyl disulfide,
(vii) Acrylic acid and methacrylic acid ring opened compounds of epoxy resin such as 3-phenoxy-2-hydroxypropyl acrylate, 3-phenoxy-2-hydroxypropyl methacrylate, acrylic acid and methacrylic acid ring opened compounds of bisphenol A glycidyl ether, and
(viii) Other especial compounds such as compounds mentioned in Japanese Patent Application Laid-open Nos.

145601/1991, 4211/1992, 161410/1992, 161411/1992 and 194486/1993, for example,
unsaturated compounds represented by formula (5):

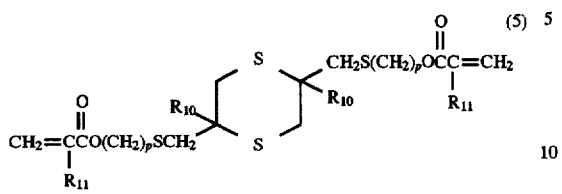

wherein p is an integer of 1 to 4; $R_{10}$ is a hydrogen atom or a methyl group; and $R_{11}$ is a hydrogen atom or a methyl group,
unsaturated compounds represented by formula (6):

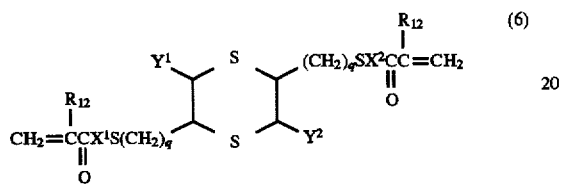

wherein $X^1$ is $—(SCH_2CH_2)_a—$; $X^2$ is $—(CH_2CH_2S)_a—$; a is an integer of 0 to 2; and each of $Y^1$ and $Y^2$ is independently a hydrogen atom or

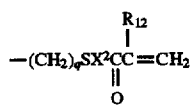

q is an integer of 0 to 5; and $R_{12}$ is a hydrogen atom or a methyl group,
unsaturated compounds represented by formula (7):

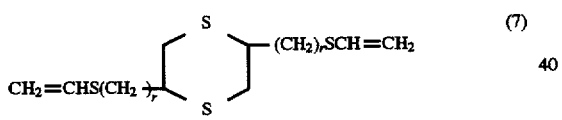

wherein r is an integer of 0 to 3,
unsaturated compounds represented by formula (8):

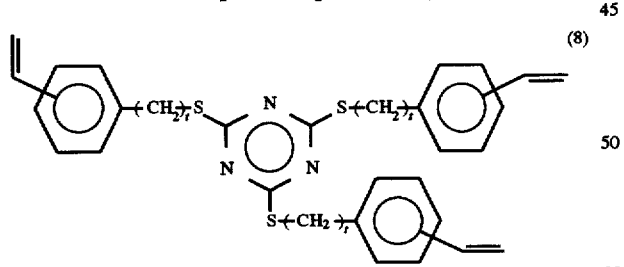

wherein t is an integer of 1 to 5, and
unsaturated compounds represented by formula (9):

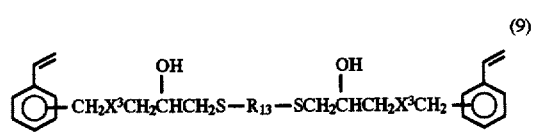

wherein $X^3$ is an oxygen atom or a sulfur atom; and $R_{13}$ is an alkyl group of $C_1$ to $C_6$, $—CH_2SCH_2—$, $—CH_2CH_2SCH_2CH_2—$, $—CH_2CH_2CH_2SCH_2CH_2CH_2—$,

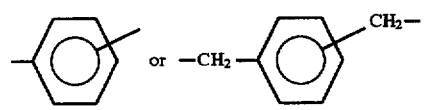

Typical examples of the unsaturated compounds represented by formula (5) include

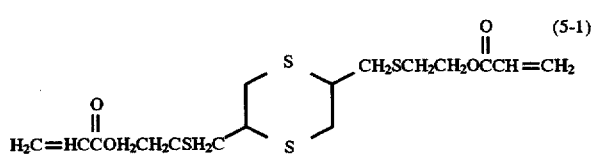

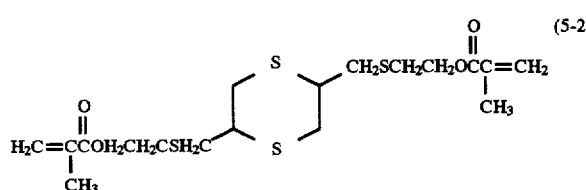

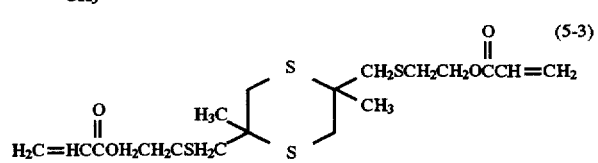

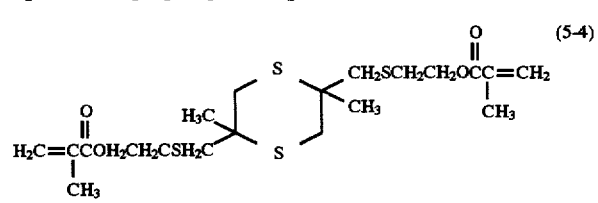

and they are not restrictive.
Typical examples of the unsaturated compounds represented by formula (6) include:

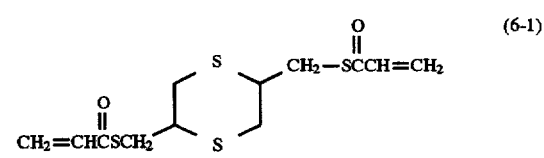

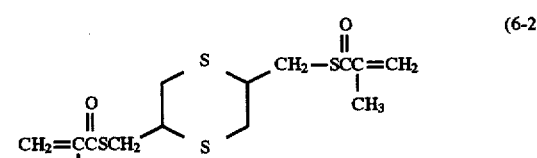

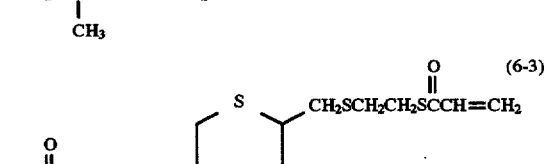

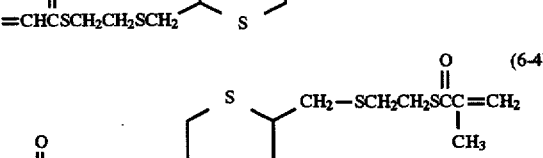

-continued
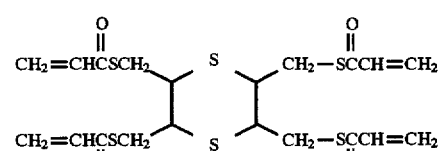
(6-5)
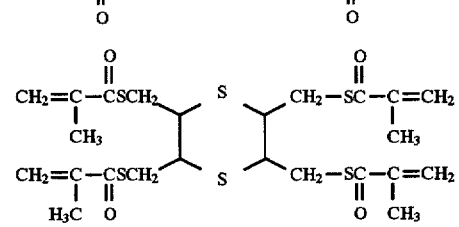
(6-6)
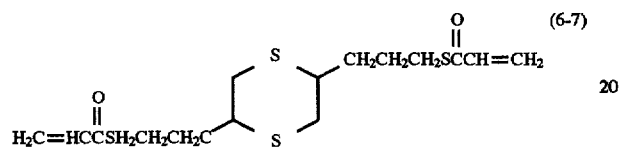
(6-7)
and they are not restrictive.
Typical examples of the unsaturated compounds represented by formula (7) include:
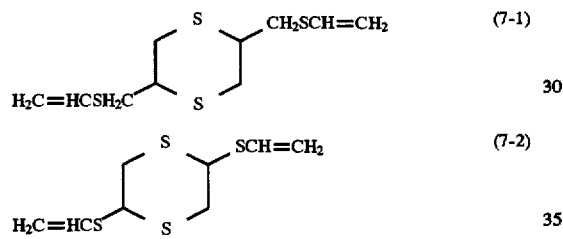
(7-1)
(7-2)
and they are not restrictive.
Typical examples of the unsaturated compounds represented by formula (8) include:
Typical examples of the unsaturated compounds represented by formula (9) include:
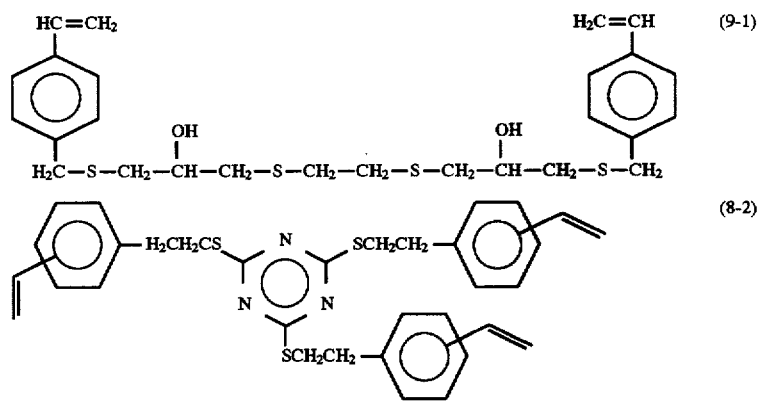
(9-1)
(8-2)
and they are not restrictive.
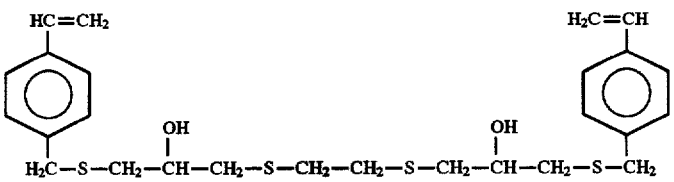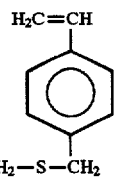
(9-1)

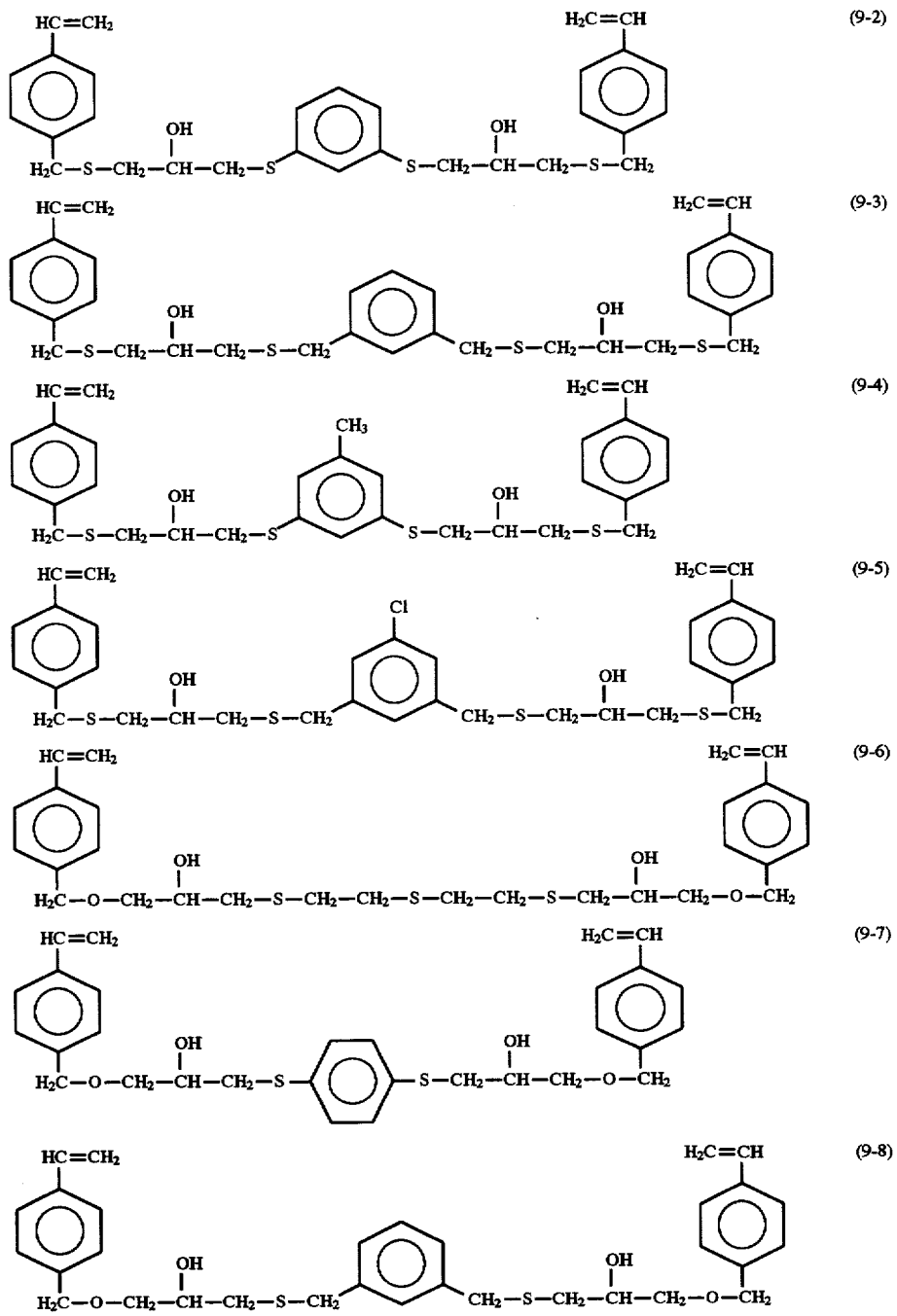

and they are not restrictive.

The above-mentioned compounds having the reactive unsaturated bond(s) may be used singly or in a combination of two or more thereof.

For the purpose of modifying the resin, a compound having a monofunctional reactive unsaturated group may be added to the above-mentioned monomer mixture.

The materials of the plastic lenses of the present invention are a urethane-based resin, a sulfide resin and a polyvinyl resin, and that is to say, the skeleton of the plastic lenses mainly comprises a thiourethane bond by an iso(thio) cyanato group and a mercapto group, a sulfide bond by the mercapto group and a reactive unsaturated group, and a polyvinyl bond by the reactive unsaturated group. However, needless to say, the plastic resin may additionally contain an allophanate bond, a urea bond, a thiourea bond, a biuret bond or the like in compliance with a use purpose. Alternatively, an amine or the like can be partially used together, and the urea bond or the biuret bond can be utilized. As just described, in the case that a compound other than the above-mentioned active hydrogen compound which reacts with the iso(thio)cyanate compound is added, it is necessary that much attention should be paid to the point of coloring.

The amount of the compound having two or more reactive unsaturated groups is preferably in the range of 30 to 70% by weight, more preferably 30 to 50% by weight based on the total weight of the composition. If a photopolymerization catalyst is used in the composition, the amount of the compound having two or more reactive unsaturated groups is preferably in the range of 10 to 70% by weight based on the total weight of the composition.

A blend ratio between the isocyanate compound, the thiol compound of formula (1) and the compound having the reactive unsaturated groups is preferably such that a functional molar ratio of {(a —NCO group+a —NCS group)+(an unsaturated group)}/((a —SH group+a —OH group) is in the range of 1.0 to 3.0. If the functional molar ratio is less than 1.0, heat resistance tends to deteriorate as the molar ratio decreases, and if it is more than 3.0, impact resistance tends to deteriorate.

In compliance with its intended purpose, various additives may be added to the composition as in a known molding method, and examples of such additives include an internal release agent, a chain extender, a crosslinking agent, a light stabilizer, an ultraviolet light absorber, an antioxidant, an oil-soluble dye and a filler.

In order to adjust the reaction rate to a desired level, a known urethane reaction catalyst or a radical polymerization catalyst can suitably be used.

The lens regarding the present invention can usually be obtained by a cast polymerization method. Typically, the iso(thio)cyanate compound, the thiol compound of formula (1), the compound having the reactive unsaturated groups and, if necessary, a polymerization catalyst are mixed, and the resulting mixture is then defoamed in a suitable manner as needed. Afterward, the mixture is injected into a mold, and photopolymerization is then carried out by the irradiation of ultraviolet light or visible light, followed by polymerization at a temperature of room temperature to about 180° C. At this time, in order to facilitate mold release after the polymerization, the mold may be subjected to a known mold release treatment, or an internal release agent may be added.

This photopolymerization can be carried out by light from a light source such as a high pressure mercury arc lamp, a halogen lamp, a xenon lamp, a tungsten lamp, a fluorescent lamp or sunlight, as in the case of a conventional photopolymerizable material.

At this time, a polymerization initiator can be used as needed, but no particular restriction is put on the kind of polymerization initiator, and there can be used a known radical generator or a light sensitizer which can generate radicals when irradiated with light.

The photopolymerization catalyst can be suitably selected from radical polymerization initiators mentioned in, for example, "Ultraviolet light curing system", Kiyoshi Kato, Total Technical Center Co., Ltd., Feb. 28, 1989 in consideration of a combination of the monomers and the shape of molded articles.

Examples of such photopolymerization catalysts include acetophenone-containing catalysts, benzoin-containing catalysts, benzophenone-containing catalysts, thioxanthone-containing catalysts, and the photopolymerization catalysts of other specific groups.

Typical examples of the acetophenone-containing catalysts include 4-phenoxydichloroacetophenone, 4-t-butyldichloroacetophenone, 4-t-butyltrichloroacetophenone, diethoxyacetophenone, 2-hydroxy-2-methyl-1-phenylpropane-1-one (trade name "Darocure-1173"), and examples of the benzoin-containing catalysts include benzoin, benzoin methyl ether, benzoin ethyl ether, benzoin isopropyl ether, benzoin isobutyl ether and benzyl methyl ketal. Examples of the benzophenone-containing catalysts include benzophenone, benzoylbenzoic acid, methyl benzoylbenzoate, 4-phenylbenzophenone and hydroxybenzophenone, and examples of the thioxanthone-containing catalysts include thioxanthone, 2-chlorothioxanthone, 2-methylthioxanthone and 2,4-dimethylthioxanthone. In addition, examples of the catalysts of the other specific groups include α-acyloxime ester, acylphosphine oxide, benzyl, camphorquinone and azobisbutyronitrile.

The amount of the photopolymerization catalyst to be used can be suitably decided in compliance with the kind of polymerization catalyst, the combination of monomers and the shape of molded articles, but the photopolymerization catalyst is used in an amount of about 10% by weight or less based on the weight of a monomer mixture.

Furthermore, if cooling is done for heat removal during the photopolymerization, a strain-free and striae-free lens can be preferably obtained.

The thus obtained urethane-based resin regarding the present invention is colorless and transparent, and has a high refractive index and low dispersion properties, and therefore, the resin is desirable as a material for optical elements such as lenses for spectacles and cameras as well as a material for glazing materials, coating compositions and adhesives. In addition, the lens made from the urethane-based resin regarding the present invention can be subjected to a physical or a chemical treatment such as surface polishing, an antistatic treatment, a hard coat treatment, a antireflective coat treatment, a dyeing treatment or a dimming treatment as needed for the sake of the prevention of reflection, the impartment of a high hardness, the improvement of wear resistance and chemical resistance, and the impartment of fog resistance and fashionability, and the like.

Next, the present invention will be described in detail with reference to examples and comparative examples. In this connection, among the performances of obtained lenses, the refractive index, Abbe number, dyeing heat resistance, appearance, scratch resistance, pencil hardness and impact resistance were evaluated in accordance with the following test procedures:

Refractive index and Abbe number: Each of the refractive index and the Abbe number was measured at 20° C. by the use of a Pulfrich refractometer.

Appearance: It was visually observed.

Dyeing heat resistance: A flat sample lens having a thickness of 1.2 mm was immersed in a dye bath at 90° C. for 5 minutes, and it was then visually observed whether or not the lens was deformed. The sample which did not deform was ranked as "A", and the deformed sample was ranked as "C".

Scratch resistance: The surface of a flat sample lens was rubbed with a steel wool of No. 00, and the state of scratches on the sample were visually observed.

The sample which was scarcely scratched as in the case of a DAC lens was ranked as "A", the sample which was scarcely scratched as in the case of Spectralite™ was ranked as "B", and the sample which was more easily scratched than in the case of Spectralite™ was ranked as "C".

Pencil hardness: It was measured in accordance with JIS K-5400.

Impact resistance: A minus lens having a central thickness of 1.5 mm was tested by dropping an iron ball from a height of 127 cm. The lens which did not break by the iron ball of 114 g was ranked as "A", the lens which did not break by the iron ball of 67 g was ranked as "B", the lens which did not break by the iron ball of 36 g was ranked as "C", and the lens which broke by the iron ball of 36 g was ranked as "D".

In the examples, "part(s)" means part(s) by weight, and "%" means % by weight.

EXAMPLE 1

32.3 parts of isophorone diisocyanate (hereinafter abbreviated to "IPDI"), 37.8 parts of 1,2-bis (2'-mercaptoethylthio)-3-propanethiol (hereinafter abbreviated to "GST"), 30.0 parts of ethylene glycol dimethacrylate (hereinafter abbreviated to "EGDMA") and 0.02% of dibutyltin dichloride (with respect to a total mixture) were mixed to form a uniform solution, and this solution was then sufficiently defoamed. In a dark room, 0.5 part of Darocure™-1173 (made by Ciba-Geigy) was added, and the solution was further stirred and then injected into a mold composed of a gasket and a glass mold which had been subjected to a mold release treatment. Next, the mixture was irradiated with the light of a high pressure mercury arc lamp for 15 minutes, and heat curing was further carried out for 2 hours in an oven at 120° C. After the completion of the polymerization, the obtained lens was cooled and then taken out from the mold.

The thus obtained lens was colorless and transparent, and substantially free from optical strain and striae, and it had refractive index $n_d$=1.579 and Abbe number $v_d$=43. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLE 2

A lens was prepared in accordance with the same procedure as in Example 1 by the use of 35.1 parts of dicyclohexylmethane-4,4'-diisocyanate (hereinafter abbreviated to "HMDI"), 34.9 parts of GST, 30.0 parts of EGDMA, 0.02% of dibutyltin dichloride (with respect to a total mixture) and 0.5 part of Darocure™-1173 (made by Ciba-Geigy).

The thus obtained lens was colorless and transparent, and substantially free from optical strain and striae, and it had refractive index $n_d$=1.578 and Abbe number $v_d$=43. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLE 3

A lens was prepared in accordance with the same procedure as in Example 1 by the use of 44.9 parts of 1,3-bis (isocyanatomethyl)cyclohexane (hereinafter abbreviated to "HXDI"), 60.2 parts of GST, 30.0 parts of EGDMA, 0.02% of dibutyltin dichloride (with respect to a total mixture) and 0.5 part of Darocure™-1173 (made by Ciba-Geigy). In this case, polymerization was carried out by the irradiation of a high pressure mercury arc lamp for 30 minutes, and heat curing was then done for 2 hours in an oven at 120° C.

The thus obtained lens was colorless and transparent, substantially free from optical strain and striae, and it had refractive index $n_d$=1.581 and Abbe number $v_d$=39. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLE 4

A lens was prepared in accordance with the same procedure as in Example 1 by the use of 29.4 parts of m-xylylene diisocyanate (hereinafter abbreviated to "XDI"), 40.6 parts of GST, 30.0 parts of trimethylolpropane trimethacrylate (hereinafter abbreviated to "TMPTMA"), 0.02% of dibutyltin dichloride (with respect to a total mixture) and 0.5 part of Darocure™-1173 (made by Ciba-Geigy). In this case, polymerization was carried out in the same manner as in Example 1.

The thus obtained lens was colorless and transparent, and substantially free from optical strain and striae, and it had refractive index $n_d$=1.615 and Abbe number $v_d$=38. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLE 5

A lens was prepared in accordance with the same procedure as in Example 1 by the use of 13.3 parts of XDI, 17.7 parts of IPDI, 39.1 parts of GST, 30.0 parts of TMPTMA, 0.02% of dibutyltin dichloride (with respect to a total mixture) and 0.5 part of Darocure™-173(made by Ciga-Geigy). In this case, polymerization was carried out in the same manner as in Example 1.

The thus obtained lens was colorless and transparent, and substantially free from optical strain and striae, and it had refractive index $n_d$=1.594 and Abbe number $v_d$=40. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLE 6

A lens was prepared in accordance with the same procedure as in Example 1 by the use of 28.1 parts of XDI, 24.6 parts of GST, 27.3 parts of pentaerythritol tetrakis(3-mercaptopropionate) (hereinafter abbreviated to "PEMP"), 30.0 parts of TMPTMA, 0.02% of dibutyltin dichloride (with respect to a total mixture) and 0.5 part of Darocure™-1173 (made by Ciba-Geigy). In this case, polymerization was carried out by the irradiation of a high pressure mercury arc lamp for 45 minutes, and heat curing was then done for 2 hours in an oven at 120° C.

The thus obtained lens was colorless and transparent, and substantially free from optical strain and striae, and it had refractive index $n_d$=1.589 and Abbe number $v_d$=41. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLES 7 to 24

Lenses were prepared in accordance with the same procedures as in Example 1 by the use of monomers shown in Table 1, and for the obtained lenses, optical properties, dyeing heat resistance, scratch resistance and impact resistance were evaluated. The results are shown in Table 2.

TABLE 1

| | Polyisocyanate (pts. wt.) | Polythiol (pts. wt.) | Compound Having Reactive Unsaturated Group (pts. wt.) |
|---|---|---|---|
| Example 7 | XDI (27.0) | GST (43.0) | EGDMA (20.0) |
| Example 8 | XDI (17.9) | GST (32.1) | EGDMA (50.0) |
| Example 9 | XDI (28.9) | GST (46.1) | BisME4PP (20.0) EGDMA (10.0) |
| Example 10 | IPDI (29.4) | GST (40.6) | BisME2.6PP (30.0) |
| Example 11 | HMDI (35.1) | GST (34.9) | BisAE2PP (30.0) |
| Example 12 | XDI (20.9) IPDI (4.7) | GST (34.4) | TMPTMA (40.0) |
| Example 13 | XDI (14.4) IPDI (25.6) | GST (40.0) | TMPTMA (20.0) |
| Example 14 | IPDI (32.1) | GST (12.6) PEMP (35.3) | TMPTMA (20.0) |
| Example 15 | IPDI (35.3) | GST (13.8) PEMP (25.9) | TMPTMA (25.0) |
| Example 16 | XDI (10.7) HMDI (22.3) | GST (37.0) | EGDMA (30.0) |
| Example 17 | XDI (11.7) HMDI (18.0) | GST (40.3) | EGDMA (30.0) |
| Example 18 | XDI (23.9) | GST (40.0) TG (6.1) | EGDMA (30.0) |
| Example 19 | IPDI (32.2) | GST (37.8) | EGDMA (20.0) TAC (10.0) |
| Example 20 | XDI (23.4) IPDI (11.8) | GST (34.8) | GDMA (30.0) |
| Example 21 | XDI (11.2) IPDI (19.9) | GST (38.9) | DPHA (30.0) |
| Example 22 | XDI (11.2) IPDI (19.9) | GST (38.9) | DPMAPA (30.0) |
| Example 23 | XDI (11.2) IPDI (19.9) | GST (38.9) | DCPDA (30.0) |
| Example 24 | XDI (11.2) IPDI (19.9) | GST (38.9) | TEGDMA (30.0) |
| Example 25 | XDI (14.3) | GST (25.7) | EGDMA (60.0) |
| Example 26 | XDI (11.6) | GST (18.4) | BisAE2PP (70.0) |

TABLE 2

| | Refractive Index ($n_d$) | Abbe Number ($v_d$) | Dyeing Heat Resistance | Scratch Resistance | Impact Resistance |
|---|---|---|---|---|---|
| Example 7 | 1.615 | 37 | A | A | A |
| Example 8 | 1.581 | 47 | A | A | B |
| Example 9 | 1.617 | 37 | A | A | A |
| Example 10 | 1.597 | 39 | A | A | A |
| Example 11 | 1.600 | 39 | A | A | A |
| Example 12 | 1.593 | 40 | A | A | B |
| Example 13 | 1.598 | 40 | A | A | A |
| Example 14 | 1.555 | 45 | A | A | A |
| Example 15 | 1.552 | 46 | A | A | A |
| Example 16 | 1.591 | 41 | A | A | A |
| Example 17 | 1.600 | 40 | A | A | A |
| Example 18 | 1.603 | 39 | A | A | A |
| Example 19 | 1.582 | 42 | A | A | B |
| Example 20 | 1.598 | 40 | A | A | A |
| Example 21 | 1.596 | 42 | A | A | B |
| Example 22 | 1.593 | 41 | A | A | A |
| Example 23 | 1.599 | 41 | A | A | A |
| Example 24 | 1.591 | 39 | A | A | A |
| Example 25 | 1.571 | 47 | A | A | C |
| Example 26 | 1.575 | 46 | A | A | C |

BiSME4PP: 2,2-bis[4-(methacryloxyethoxyethoxy) phenyl]propane

BisME2.6PP: 2,2-bis[4-(methacryloxypolyethoxy) phenyl]propane

BisAE2PP: 2,2-bis[4-(acryloxyethoxyethoxy)phenyl] propane

GDMA: Glycerin dimethacrylate

DPHA: Dipentaerythritol hexaacrylate

DPMAPA: Dipentaerythritolmonoalkyl pentaacrylate

DCPDA: Dicyclopentanyl diacrylate

TE GDMA: Triethylene glycol dimethacrylate

Comparative Example 1

A lens was prepared by the use of 52.0 parts of XDI, 48.0 parts of GST and 0.02% of dibutyltin dichloride (with respect to a total mixture). In this case, in order to obtain the lens which was free from optical strain and striae, it was required that a material mixture was heated from 20° C. to 120° C. over 10 hours.

The thus obtained lens was colorless and transparent, and substantially free from optical strain and striae, and it had refractive index $n_d$=1.660 and Abbe number $v_d$=33. In addition, when the lens was dyed in a dye bath at 90° C., dyeability was excellent, but the lens was deformed. In an iron ball drop test, the lens did not break by an iron ball of 114 g, but when rubbed with a steel wool, the lens was noticeably scratched, and the evaluation of scratch resistance was "C".

Comparative Example 2

17.0 parts of XDI, 23.0 parts of PEMP, 40.0 parts of UM (urethane dimethacrylate obtained by reacting 2,6-tolylene diisocyanate with 2-hydroxypropyl methacrylate), 20.0 parts of phenyl methacrylate and 0.05 part of tributyltin dichloride were mixed to form a uniform solution, and this solution was then sufficiently defoamed. In a dark room, 0.1 part of 2,4,6-trimethylbenzoyldiphenylphosphine oxide and 0.1 part of 2-hydroxybenzophenone were added, and the solution was further stirred and then injected into a mold composed of a gasket and a glass mold which had been subjected to a mold release treatment. Next, the mixture was irradiated with the light of a high pressure mercury arc lamp for 15 minutes, and heat curing was further carried out for 2 hours in an oven at 120° C. After the completion of the polymerization, the obtained lens was cooled and then taken out from the mold.

The thus obtained lens was colorless and transparent, and substantially free from optical strain and striae, and it had refractive index $n_d$=1.587 and Abbe number $v_d$=40. In addition, when the lens was dyed in a dye bath at 90° C., dyeability was excellent, and the lens was not deformed. When rubbed with a steel wool, the lens was not scratched, and so the evaluation of scratch resistance was "A". However, in an iron ball drop test, the lens was broken by an iron ball of 36 g, and the evaluation of impact resistance was "D".

Comparative Example 3

A lens was prepared in accordance with the same procedures as in Comparative Example 2 by the use of 20.0 parts of XDI, 30.0 parts of PEMP, 35.0 parts of UM, 15.0 parts of phenyl methacrylate, 0.1 part of 2,4,6-trimethylbenzoyldiphenylphosphine oxide and 0.1 part of 2-hydroxybenzophenone.

The thus obtained lens was colorless and transparent, and substantially free from optical strain and striae, and it had refractive index $n_d$=1.588 and Abbe number $v_d$=40. In addition, when the lens was dyed in a dye bath at 90° C., dyeability was excellent, and the lens was not deformed. When rubbed with a steel wool, the lens was not scratched, and so the evaluation of scratch resistance was "A". However, in an iron ball drop test, the lens was broken by an iron ball of 36 g, and the evaluation of impact resistance was "D".

EXAMPLE 27

6.9 parts of XDI, 26.1 parts of GST, 57.0 parts of tris(acryloyloxyethyl) isocyanurate, 5.0 parts of ethylene glycol dimethacrylate, 5.0 parts of divinylbenzene, 0.03% of dibutyltin dichloride, 0.04% of 2-hydroxy-2-methyl-1-phenylpropane-1-one and 0.1% of JP-506 (trade name, made by Johoku Kagaku Co., Ltd., acid phosphate) were mixed, and then defoamed.

The resulting composition was injected into a glass mold composed of two glass plates and a polyester adhesive tape and having a central thickness of 1.5 mm, and it was irradiated with the light of a high pressure mercury arc lamp for 5 minutes to cure it. Furthermore, heating was further carried out at 130° C. for 1 hour, and the obtained lens was then taken out from the mold.

The thus obtained plastic lens was colorless and transparent, and substantially free from optical strain and striae, and it had refractive index $n_d$=1.587 and Abbe number $v_d$=41. In addition, when the lens was dyed in a dye bath at 90° C., dyeability was excellent, and the lens was not deformed. When rubbed with a steel wool, the lens was not scratched, and so the evaluation of scratch resistance was "A". In an iron ball drop test, the lens did not break by an iron ball of 36 g, and the evaluation of impact resistance was "C".

EXAMPLE 28

A lens was prepared in accordance with the same procedure as in Example 1 by the use of 23.2 parts of bis(isocyanatomethyl)norbornane (hereinafter abbreviated to "NBDI"), 40 parts of GST, 10 parts of diethylene glycol bisallylcarbonate, 32.5 parts of pentaerythritol tris(acrylate), 0.125 part of dimethyltin dichloride, 0.06 part of di-t-butyl peroxide and 0.06 part of Darocure™-1173.

The thus obtained lens was colorless and transparent, and substantially free from optical strain and striae, and it had refractive index $n_d$=1.590 and Abbe number $v_d$=45. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

EXAMPLE 29

A lens was prepared in accordance with the same procedure as in Example 1 by the use of 23.2 parts of NBDI, 40 parts of GST, 5 parts of divinylbenzene, 32.5 parts of pentaerythritol tris(acrylate), 0.06 part of dimethyltin dichloride, 0.10 part of di-t-butyl peroxide and 0.06 part of Darocure™-1173.

The thus obtained plastic lens was colorless and transparent, and substantially free from optical strain and striae, and it had refractive index $n_d$=1.600 and Abbe number $v_d$=42. In addition, when the lens was dyed in a dye bath at 90° C., dyeability was excellent, and the deformation of the lens was not observed. When rubbed with a steel wool, the lens was not scratched, and the evaluation of scratch resistance was "A", and the pencil hardness of the lens was 5H. In an iron ball drop test, the lens did not break by an iron ball of 114 g, and the evaluation of impact resistance was also "A".

Comparative Example 4

118 parts of XDI, 130 parts of GST, 114 parts of 1,3-bis(methacryloyl) glycerin, 0.005% of dibutyltin dichloride (with respect to a total mixture), 0.10% of di-t-butyl peroxide (with respect to the total mixture) and 0.30% of dioctyl phosphate (with respect to the total mixture) were mixed to form a uniform mixture, and this mixture was then injected into a mold composed of a glass mold and a gasket. Next, the mixture was heated from 45° C. to 130° C. over 3 hours to cure it, and heat curing was further carried out at 130° C. for 1 hour. After the completion of the polymerization, the obtained lens was cooled and then taken out from the mold.

The thus obtained lens was colorless and transparent, and substantially free from optical strain and striae, and it had refractive index $n_d$=1.595 and Abbe number $v_d$=38. In addition, when the lens was dyed in a dye bath at 90° C., dyeability was excellent, and the deformation of the lens was not observed. In an iron ball drop test, the lens did not break by an iron ball of 114 g, and the evaluation of impact resistance was also "A". However, when rubbed with a steel wool, the lens was noticeably scratched, and so the evaluation of scratch resistance was "C". The pencil hardness of the lens was 3H.

Comparative Example 5

A composition of Example 2 in Japanese Patent Application Laid-open No. 228659/1995 was subjected to heat polymerization in the same manner as in Comparative Example 4. The obtained lens was substantially free from optical strain and striae, and it had refractive index $n_d$=1.630 and Abbe number $v_d$=33. In addition, when the lens was dyed in a dye bath at 90° C., dyeability was excellent, and the deformation of the lens was not observed. In an iron ball drop test, the lens did not break by an iron ball of 114 g, and the evaluation of impact resistance was also "A". However, when rubbed with a steel wool, the lens was noticeably scratched, and so the evaluation of scratch resistance was "C". The pencil hardness of the lens was 3H.

As is apparent from the above-mentioned examples and comparative examples, a urethane-based resin regarding the present invention is good optical properties and excellent impact resistance, heat resistance and scratch resistance, and in addition, the resin can be polymerized in a short period of time. Therefore, the urethane-based resin of the present invention is desirable as a material for optical elements such as lenses for spectacles and cameras as well as a material for glazing materials, coating compositions and adhesives.

What is claimed is:

1. A sulfur-containing urethane resin composition which comprises a polythiol compound represented by formula (1):

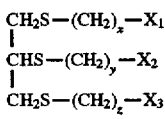

(1)

wherein $X_1$, $X_2$ and $X_3$ each is a hydrogen atom or a mercapto group; x, y and z each is an integer of 0 to 8; and in their combinations, formula (1) has at least two mercapto groups, a polyiso(thio)cyanate compound, and a compound having two or more reactive unsaturated groups and neither a hydroxyl group nor a mercapto group in an amount of 30 to 70% by weight based on the total weight of the composition.

2. The sulfur-containing urethane resin composition according to claim 1 wherein the amount of the compound having two or more reactive unsaturated groups is in the range of 30 to 50% by weight based on the total weight.

3. The sulfur-containing urethane-based resin composition according to claim 1 which contains another polythiol compound or a thiol compound having a hydroxyl group in addition to the polythiol of formula (1).

4. The sulfur-containing urethane resin composition according to claim 3 wherein the polyiso(thio)cyanate compound, the compound having the reactive unsaturated groups, the polythiol of formula (1), and the other polythiol compound or the thiol compound having the hydroxyl group is such that a functional group molar ratio of {the iso(thio)cyanate group+the reactive unsaturated group}/{the mercapto group+the hydroxyl group} is in the range of 1.0 to 3.0.

5. A sulfur-containing urethane resin composition which comprises a polythiol compound represented by formula (1):

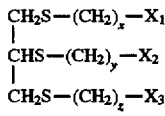

(1)

wherein $X_1$, $X_2$ and $X_3$ each is a hydrogen atom or a mercapto group; x, y and z each is an integer of 0 to 8; and in their combinations, formula (1) has at least two mercapto groups, a polyiso(thio)cyanate compound, a compound having two or more reactive unsaturated groups and neither a hydroxyl group nor a mercapto group in an amount of 10 to 70% by weight based on the total weight of the composition, and a photopolymerization catalyst.

6. The sulfur-containing urethane resin composition according to claim 5 wherein the amount of the compound having two or more reactive unsaturated groups is in the range of 30 to 50% by weight based on the total weight.

7. The sulfur-containing urethane resin composition according to claim 5 which contains another polythiol compound or a thiol compound having a hydroxyl group in addition to the polythiol of formula (1).

8. The sulfur-containing urethane resin composition according to claim 7 wherein the polyiso(thio)cyanate compound, the compound having the reactive unsaturated groups, the polythiol of formula (1), and the other polythiol compound or the thiol compound having the hydroxyl group is such that a functional group molar ratio of {the iso(thio)cyanate group+the reactive unsaturated group}/{the mercapto group+the hydroxyl group} is in the range of 1.0 to 3.0.

9. A sulfur-containing urethane resin obtained by polymerizing the composition of claim 1.

10. A sulfur-containing urethane resin obtained by polymerizing the composition of claim 2.

11. A sulfur-containing urethane resin obtained by polymerizing the composition of claim 3.

12. A sulfur-containing urethane resin obtained by polymerizing the composition of claim 4.

13. A sulfur-containing urethane resin obtained by polymerizing the composition of claim 5.

14. A sulfur-containing urethane resin obtained by polymerizing the composition of claim 6.

15. A sulfur-containing urethane resin obtained by polymerizing the composition of claim 7.

16. A sulfur-containing urethane resin obtained by polymerizing the composition of claim 8.

17. An optical element which comprises the resin of claim 9.

18. An optical element which comprises the resin of claim 10.

19. An optical element which comprises the resin of claim 11.

20. An optical element which comprises the resin of claim 12.

21. An optical element which comprises the resin of claim 13.

22. An optical element which comprises the resin of claim 14.

23. An optical element which comprises the resin of claim 15.

24. An optical element which comprises the resin of claim 16.

25. A lens which comprises the optical element of claim 17.

26. A lens which comprises the optical element of claim 18.

27. A lens which comprises the optical element of claim 19.

28. A lens which comprises the optical element of claim 20.

29. A lens which comprises the optical element of claim 21.

30. A lens which comprises the optical element of claim 22.

31. A lens which comprises the optical element of claim 23.

32. A lens which comprises the optical element of claim 24.

33. A process for preparing a sulfur-containing urethane resin which comprises a step of curing by irradiating UV rays or visible rays a sulfur-containing urethane resin composition comprising a polythiol compound represented by formula (1):

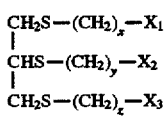

(1)

wherein $X_2$, $X_2$ and $X_3$ each is a hydrogen atom or a mercapto group; x, y and z each is an integer of 0 and 8; and in their combinations, formula (1) has at least two mercapto groups, a polyiso(thio)cyanate compound, and a compound having two or more reactive unsaturated groups and neither a hydroxyl group nor a mercapto group in an amount of 10 to 70% by weight based on the total weight of the composition.

34. A sulfur-containing urethane resin which is obtained by the process of claim 33.

35. An optical element which comprises the resin of claim 34.

36. A lens which comprises the optical element of claim 35.

* * * * *

UNITED STATES PATENT AND TRADEMARK OFFICE
CERTIFICATE OF CORRECTION

PATENT NO. : 5,736,609
DATED : Apr. 7, 1998
INVENTOR(S) : Yoshihiro Irizato, et al It is certified that error appears in the above-identified patent and that said Letters Patent is hereby corrected as shown below:

In Section [57], in the first paragraph of the abstract, please delete "The present invention discloses a sulfur-containing urethane-based resin composition of the present invention is directed to a" and insert --A--.

In claim 3 line 1, delete "-based"
In claim 33, line 7, delete the first occurrence of "$X_2$" and insert --$X_1$--.

Signed and Sealed this

Seventh Day of September, 1999

Q. TODD DICKINSON

*Attest:*

*Attesting Officer*    *Acting Commissioner of Patents and Trademarks*